No. 877,134. PATENTED JAN. 21, 1908.
J. H. SPRAGUE & E. WARMBRODT.
ANIMAL TRAP.
APPLICATION FILED FEB. 9, 1907.
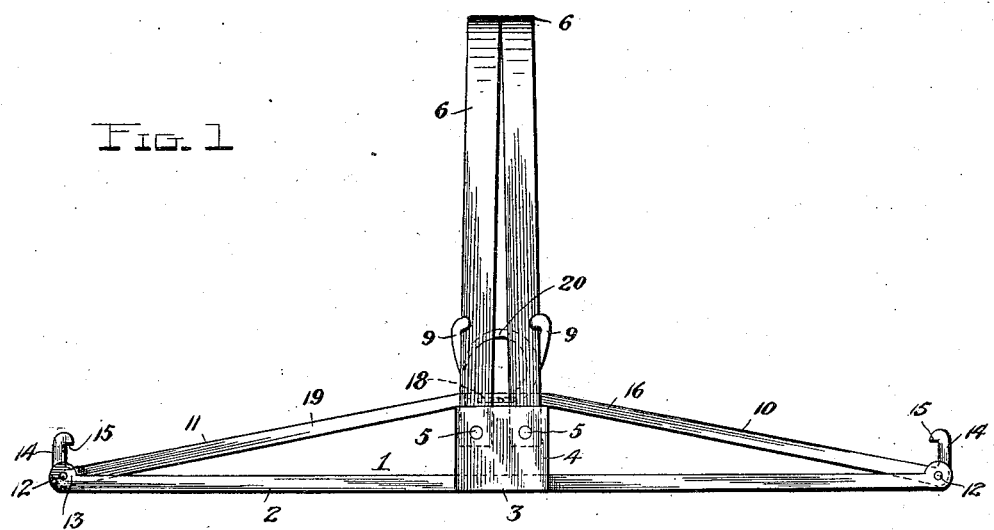
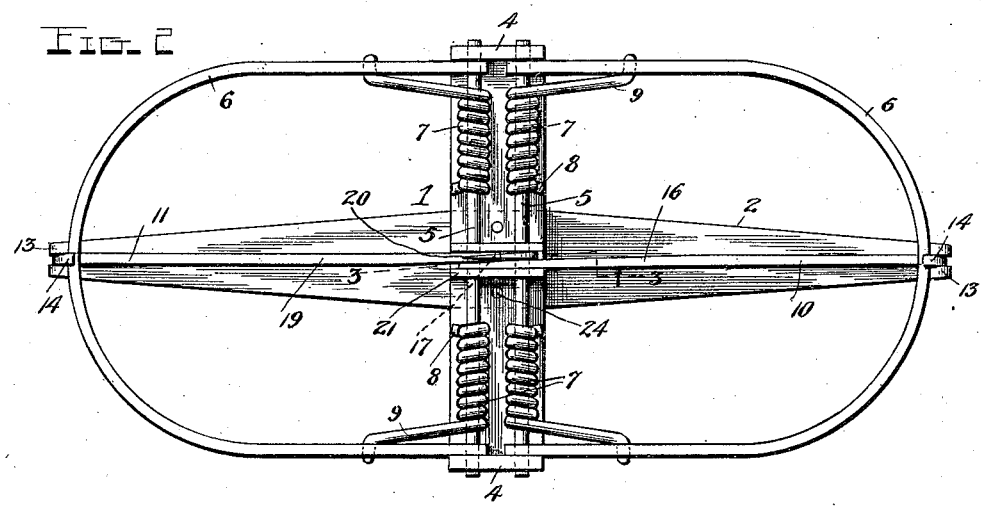
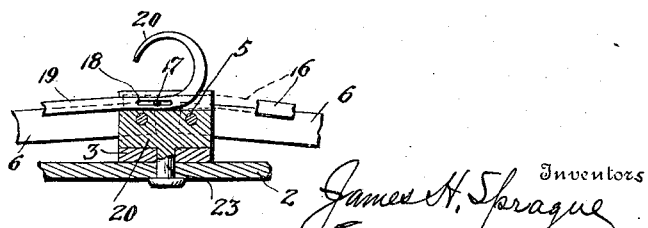
Witnesses
Inventors
James H. Sprague
Edward Warmbrodt
By Watson E. Coleman
Attorney

UNITED STATES PATENT OFFICE.

JAMES H. SPRAGUE AND EDWARD WARMBRODT, OF GLENWOOD SPRINGS, COLORADO, SAID WARMBRODT ASSIGNOR TO SAID SPRAGUE, OF RIFLE, COLORADO.

ANIMAL-TRAP.

No. 877,134.  Specification of Letters Patent.  Patented Jan. 21, 1908.

Application filed February 9, 1907. Serial No. 356,594.

*To all whom it may concern:*

Be it known that we, JAMES H. SPRAGUE and EDWARD WARMBRODT, citizens of the United States, residing at Glenwood Springs, in the county of Garfield and State of Colorado, have invented certain new and useful Improvements in Animal-Traps, of which the following is a specification, reference being had therein to the accompanying drawing.

Our invention relates to improvements in animal traps of the spring jaw type and it consists in the novel construction, combination and arrangement of parts hereinafter described and claimed.

The object of the invention is to provide a trap of this character having its jaws controlled by a bait trigger which will only release them when an animal seizes the bait in its mouth and gives the trigger an upward pull, in which event the jaws will swing toward each other and catch the animal's head between them, thus securing a much more effective hold than that of the ordinary foot trip.

The above and other objects which will appear when the nature of the invention is better understood are accomplished by the improved construction illustrated in the accompanying drawings, in which Figure 1 is a side elevation of the trap, showing its jaws sprung or in their closed position; Fig. 2 is a top plan view of the trap, the jaws being in their set or open position; and Fig. 3 is a detail vertical longitudinal section taken on the planes indicated by the line 3—3 in Fig. 2.

Our improved trap comprises a base 1 consisting preferably of a longitudinally extending plate 2 and a centrally arranged cross piece or plate 3 which has its opposite ends bent upwardly at right angles to form bearings 4 for two transversely extending pivot rods 5. Upon the rods 5 are pivoted the inner open ends of substantially U-shaped jaws 6. These jaws are opposed to each other as will be seen upon reference to Fig. 2 and they are adapted to swing upwardly toward each other as shown in Fig. 1 to catch the animal between them. This upward closing movement of the jaws is produced preferably by four coil springs 7 which surround the pivot rods 5 and each of which has one of its ends 8 bearing upon the cross piece 3 and its other end 9 engaged with one of the parallel arms of the jaws 6.

The jaws are held in their open or set position shown in Fig. 2 by a pair of longitudinally extending triggers 10 and 11 arranged upon the plate 2. These triggers are in the form of bell cranks pivoted at their angles upon pins 12 arranged in the enlarged bifurcated ends 13 of the plate 2. The short upwardly projecting arms 14 of the triggers are in the form of hooks and have shoulders 15 to engage the outer and upper edges of the curved ends of the jaws 6. The long inner end 16 of the trigger 10 carries a transversely projecting pin 17 which projects through and slides in a longitudinal slot 18 formed in the inner end 19 of the other trigger 11 which end 19 is curved as shown to provide a bait hook 20. The pin and slot connection between the inner ends 16, 19 of the two triggers causes them to swing together and to simultaneously engage and release the two jaws 6. Said inner ends of the triggers are guided in their slight vertical swinging movement by a centrally arranged block 21 having in its top a groove or recess to receive said ends. As shown in Fig. 3, the center block 21 forms a central bearing for the pivoted rods 5 and further serves to unite the longitudinal and cross plates 2, 3 by having upon its bottom a rivet stud 23 which projects through alining apertures in said plates 2, 3 and has its lower end headed. The plates 2, 3 may be further secured together by rivets 24 as shown in Fig. 2, or any other suitable means may be provided for uniting said parts.

To set the trap, the bait is placed upon the downwardly curved hook 20 which will effectively engage and hold it, and the jaws 6 are then swung downwardly in opposite directions so that their curved outer ends will pass beneath the shoulders 15 on the upright arms or hooks 14 of the two triggers when the latter are in the position shown in Fig. 1. When the upper edges of the jaws are beneath said shoulders, the inner ends 16, 19 of the triggers are pressed downwardly and into the groove or recess in the top of the guide block 21, whereupon the arms or ends 14 will be swung inwardly so that the shoulders 15 will take over the upper and outer edges of the curved portions of the jaws and will hold them down against the tension of their actuating springs. Owing to the tension exerted by the jaws upon the triggers their inner ends will be retained in the guide 21 and in engagement with the bottom of the recess or slot therein, as shown in Fig. 3, and since this recess or slot is just sufficiently wide to receive the overlapping inner ends of the triggers they will be prevented from swinging or springing laterally and hence can only be actuated by pulling upwardly upon them or upon the bait on the hook 20. Hence it will be practically impossible for an animal to reach and remove the bait with its paw, and it will be necessary for the animal in order to secure the bait, to take it in its mouth and pull upwardly upon it. This act will release the triggers from the jaws and they will swing together and effectively catch the animal by its head. It will be seen that as soon as the bait hook is pulled upwardly both triggers will be simultaneously operated owing to the pin and slot connection between them and both jaws will be simultaneously released by the outward movement of the arms or hooks 14. The trap may be made in different sizes so as to adapt it for catching different kinds of animals, but when it is designed for catching large ones its jaws are preferably provided with teeth as is common in traps of this description.

Having thus described our invention what we claim and desire to secure by Letters Patent is:

1. A trap of the character described having a pair of spring actuated jaws pivoted to swing toward each other, a pair of triggers to engage said jaws and hold them open, the inner ends of said triggers being connected for simultaneous movement in a vertical plane and one of them having a bait retaining means, and means to engage and guide the inner ends of said triggers and prevent lateral movement of the same whereby said triggers will only release the jaws when their inner ends are moved upwardly.

2. A trap of the character described having a pair of spring actuated jaws pivoted to swing toward each other, a pair of triggers to engage said jaws and hold them open, the inner ends of said triggers being connected for simultaneous movement in a vertical plane and a recessed guide arranged beneath said inner ends of the triggers and adapted to receive them in its recess and prevent them from swinging or springing laterally.

3. A trap of the character described comprising a longitudinally extending base plate having bearings at its ends, a cross piece arranged centrally upon said base plate and having bearings at its ends, transversely extending pivot rods in the bearings on said cross piece, U-shaped jaws having their open inner ends pivoted upon said rods, coil springs upon said rods for actuating said jaws, right angular shaped triggers pivoted in the bearings at the ends of said base plate and formed at their outer ends with hooks to engage the outer ends of said jaws, a slot and pin connection between the inner ends of said triggers, a guide for the inner ends of said triggers and a bait hook carried by the inner end of one of said triggers, substantially as described.

4. A trap of the character described having a pair of spring actuated jaws pivoted to swing toward each other, a pair of triggers to engage said jaws and hold them open, said triggers being of right angular form and pivoted at their angles with their short outer ends arranged upon the exterior of the outer ends of the jaws and formed with shoulders to engage the outer and upper edges of said ends of the jaws, the long inner ends of said triggers being connected for simultaneous movement in a vertical plane and one of them having means for engaging and holding bait, and a guide arranged to engage the inner ends of said triggers and to prevent them from swinging or spring laterally.

5. A trap of the character described comprising longitudinal and transverse intersecting plates, opposing spring actuated jaws upon said transverse plate, a pair of triggers upon said longitudinal plate to engage said jaws and hold them open, the overlapping inner ends of said triggers being connected for simultaneous movement and one of them having a bait retaining means and a guide arranged at the point of intersection of said plates and adapted to engage the inner ends of said triggers to prevent them from swinging or springing laterally.

6. A trap of the character described comprising longitudinal and transverse intersecting plates, opposing spring actuated jaws upon said transverse plate, a pair of triggers upon said longitudinal plate to engage said jaws and hold them open, the overlapping inner ends of said triggers being connected for simultaneous movement and one of them having a bait retaining means, and a guide block having a securing stud passed through said intersecting plate to unite them and also having a slot or recess to receive the inner ends of said triggers and guide them in their movement.

In testimony whereof we hereunto affix our signatures in presence of two witnesses.

JAMES H. SPRAGUE.
EDWARD WARMBRODT.

Witnesses:
  GEORGE R. HOWEY,
  GALATIA M. SPRAGUE.